United States Patent
Levine et al.

(10) Patent No.: US 7,346,476 B2
(45) Date of Patent: Mar. 18, 2008

(54) EVENT TRACING WITH TIME STAMP COMPRESSION

(75) Inventors: Frank Eliot Levine, Austin, TX (US); Milena Milenkovic, Madison, AL (US); Robert J. Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/083,333

(22) Filed: Mar. 17, 2005

(65) Prior Publication Data

US 2006/0212244 A1   Sep. 21, 2006

(51) Int. Cl.
*G06F 19/00* (2006.01)
*G06F 17/40* (2006.01)

(52) U.S. Cl. .................. 702/187; 700/108; 702/33; 702/182; 702/186; 702/189

(58) Field of Classification Search ............. 702/150, 702/152, 153, 189, 190, 33, 127, 182, 186, 702/187; 455/456.1; 340/500, 517, 523, 340/526, 635, 679; 700/90, 108
See application file for complete search history.

(56) References Cited

U.S. PATENT DOCUMENTS

| | | | | |
|---|---|---|---|---|
| 2,883,255 A * | 4/1959 | Anderson | .................... | 346/34 |
| 3,351,910 A * | 11/1967 | Miller et al. | ................... | 714/47 |
| 3,906,454 A | 9/1975 | Martin | | |
| 5,608,866 A * | 3/1997 | Horikawa | ..................... | 714/39 |
| 5,715,387 A | 2/1998 | Barnstijn et al. | ...... | 395/183.14 |
| 5,799,322 A | 8/1998 | Mosher, Jr. | .................. | 707/202 |
| 5,918,225 A | 6/1999 | White et al. | | |
| 5,937,413 A | 8/1999 | Hyun et al. | .................. | 707/201 |
| 6,049,798 A * | 4/2000 | Bishop et al. | ................ | 707/10 |
| 6,091,712 A * | 7/2000 | Pope et al. | .................. | 370/244 |
| 6,148,437 A | 11/2000 | Shah et al. | | |
| 6,363,436 B1 | 3/2002 | Hagy et al. | .................. | 709/331 |
| 6,507,805 B1 | 1/2003 | Gordon et al. | .............. | 702/186 |
| 6,525,322 B2 * | 2/2003 | Wong et al. | ........... | 250/363.09 |
| 6,598,012 B1 | 7/2003 | Berry et al. | ................. | 702/187 |
| 6,658,416 B1 | 12/2003 | Hussain et al. | ............... | 707/10 |
| 6,678,883 B1 | 1/2004 | Berry et al. | ................ | 717/128 |
| 6,691,207 B2 | 2/2004 | Litt et al. | ................... | 711/108 |
| 6,708,169 B1 | 3/2004 | Berry et al. | | |
| 6,741,952 B2 | 5/2004 | Eidson | ....................... | 702/187 |

(Continued)

OTHER PUBLICATIONS

IBM Research Disclosure 421134, "Split-Memory Facility for Windows NT(tm)", May 1999, pp. 729-730.

(Continued)

*Primary Examiner*—Edward Cosimano
(74) *Attorney, Agent, or Firm*—Duke W. Yee; Herman Rodriguez; Gerald H. Glanzman

(57) ABSTRACT

An improved method, apparatus, and computer instructions for generating trace data. In response to detecting a new trace event, a determination is made as to whether the new trace event occurred at an expected period of time with respect to a prior trace event. A time stamp in the trace data is placed in response to a determination that the new trace event did not occur at the expected period of time, wherein time stamps occurring at the expected period if time are eliminated from the trace data and wherein compression of the trace data occurs.

7 Claims, 6 Drawing Sheets

U.S. PATENT DOCUMENTS

| | | | |
|---|---|---|---|
| 6,766,511 B1 | 7/2004 | Berry et al. | 717/128 |
| 6,802,031 B2* | 10/2004 | Floyd et al. | 714/45 |
| 6,936,822 B2* | 8/2005 | Wong et al. | 250/363.09 |
| 6,937,961 B2 | 8/2005 | Cabral et al. | |
| 7,213,176 B2* | 5/2007 | Banko | 714/38 |
| 2002/0121603 A1* | 9/2002 | Wong et al. | 250/363.09 |
| 2003/0154028 A1 | 8/2003 | Swaine et al. | 702/1 |
| 2004/0036025 A1* | 2/2004 | Wong et al. | 250/363.09 |
| 2004/0158776 A1 | 8/2004 | McCullough et al. | 714/45 |
| 2005/0144526 A1* | 6/2005 | Banko | 714/38 |
| 2005/0210454 A1 | 9/2005 | Dewitt, Jr. et al. | |
| 2006/0010352 A1* | 1/2006 | Mukherjee et al. | 714/47 |
| 2006/0212242 A1* | 9/2006 | Levine et al. | 702/79 |
| 2006/0212243 A1* | 9/2006 | Levine et al. | 702/79 |
| 2006/0212244 A1* | 9/2006 | Levine et al. | 702/79 |
| 2006/0212761 A1* | 9/2006 | Levine et al. | 714/45 |
| 2006/0215997 A1* | 9/2006 | Kamio et al. | 386/95 |

OTHER PUBLICATIONS

Fox et al., "Compressing Address Trace Data for Cache Simulations", IEEE 1997, pp. 439.

Johnson et al., "PDATS Lossless Address Trace Compression for Reducing File Size and Access Time", 1994 IEEE International Phoenix Conference on Computers and Communications, pp. 213-219.

Levine et al. Event Tracing Using Hash Tables with Support for Dynamic Address to Name Resolution.

Levine et al. Event Tracing with Time Stamp Compression and History Buffer Based Compression.

Levine et al. Data and Instruction Address Compression.

Milenkovic et al., "Exploiting Streams in Instruction and Data Address Trace Compression", Proceedings of IEEE 6$^{th}$ Annual Workshop on Workload Characterization, Austin, TX, Oct. 2003, pp. 99-107.

Burtscher et al., "Compressing extended program traces using value predictors", Parallel Architectures and Compilation Techniques, 2003, Proceedings of 12$^{th}$ International Conference on PACT 2003, pp. 159-169.

* cited by examiner

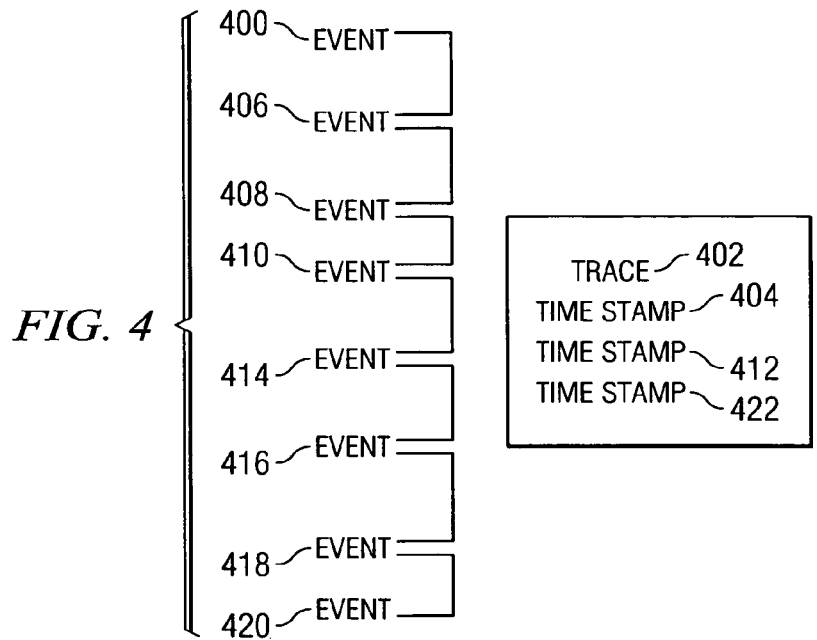
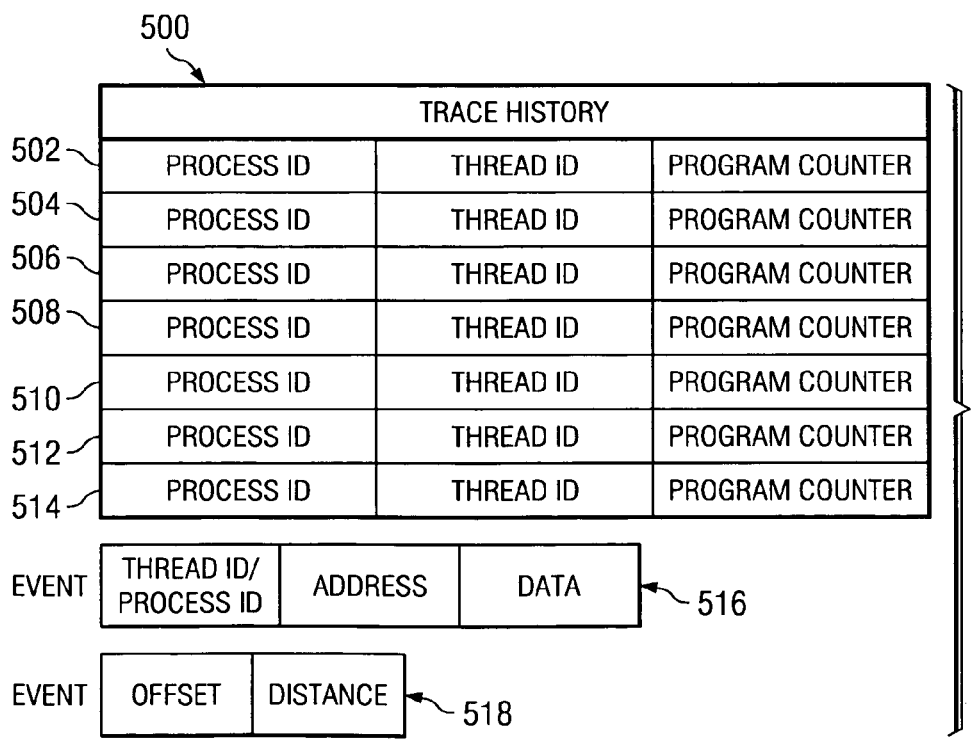

| 602 | NAME | THREAD ID | ADDRESS | COUNT | VALID |
|---|---|---|---|---|---|
| 604 | NAME | THREAD ID | ADDRESS | COUNT | VALID |
| 606 | NAME | THREAD ID | ADDRESS | COUNT | VALID |
| 608 | NAME | THREAD ID | ADDRESS | COUNT | VALID |

EVENT TRACING WITH TIME STAMP COMPRESSION

The U.S. Government has a paid-up license in this invention and the right in limited circumstances to require the patent owner to license others on reasonable terms as provided for by the terms of contract number NBCH30390004 awarded by PERCS.

CROSS REFERENCE TO RELATED APPLICATIONS

The present invention is related to the following applications entitled: Event Tracing with Time Stamp Compression and History Buffer Based Compression, Ser. No. 11/083, 228, file Mar. 17, 2005, entitled: Event Tracing Using Hash Tables with Support for Dynamic Address to Name Resolution, Ser. No. 11/083,248, filed Mar. 17, 2005, and entitled: Data and Instruction Address Compression, Ser. No. 11/083, 229, file Mar. 17, 2005, assigned to the same assignee, and incorporated herein by reference.

BACKGROUND OF THE INVENTION

1. Technical Field

The present invention relates generally to an improved data processing system. In particular, the present invention provides a method and apparatus for obtaining performance data in a data processing system. Still more particularly, the present invention provides a method and apparatus for hardware assistance to software tools in obtaining performance data in a data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. A trace contains data about the execution of code. For example, a trace may contain records about events generated during the execution of the code. A trace may include information, such as a process identifier, a thread identifier, and a program counter. The information in a trace may vary depending on a particular profiling or analysis that is to be performed. A record is a unit of information relating to an event.

One technique keeps track of particular sequences of instructions by logging certain events as they occur, a so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records, similar to entry-exit records, also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots". Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is an executable portion of the larger program being profiled, may be recorded during the intervals. These values may be resolved against a load map and symbol table information for the data processing system at post-processing time, and a profile of where the time is being spent may be obtained from this analysis.

With time profiling performance analysis, support for dynamic loading and unloading of modules and just-in-time (JIT) compiled methods typically uses tracing with time stamps. Time profiling is also referred to as "tprof". The time stamps are used to allow for playing back the trace to repeat the history of load information to allow for the dynamic resolution of address to name. This resolution is especially important for JIT. However, a tprof trace containing time stamps may require large memory resources to hold and analyze the trace.

Other solutions that are currently available avoid using any time stamps. Instead of using time stamps, these types of solutions write out address mapping when a module unload occurs. This approach requires a real time consumption of the information, which can significantly affect performance in a data processing system.

Thus, it would be advantageous to have an improved method, apparatus, and computer instructions for generating trace data during time profiling analysis in a manner that reduces or compresses the amount of trace data generated.

SUMMARY OF THE INVENTION

The present invention provides an improved method, apparatus, and computer instructions for generating trace data. In response to detecting a new trace event, a determination is made as to whether the new trace event occurred at an expected period of time with respect to a prior trace event. A time stamp in the trace data is placed in response to a determination that the new trace event did not occur at the expected period of time, wherein time stamps occurring at the expected period of time are eliminated from the trace data and wherein compression of the trace data occurs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating the generation of events and time stamps in accordance with a preferred embodiment of the present invention;

FIG. 5 is a trace history in accordance with a preferred embodiment of the present invention;

DETAILED DESCRIPTION OF THE PREFERRED EMBODIMENT

Figure 1:
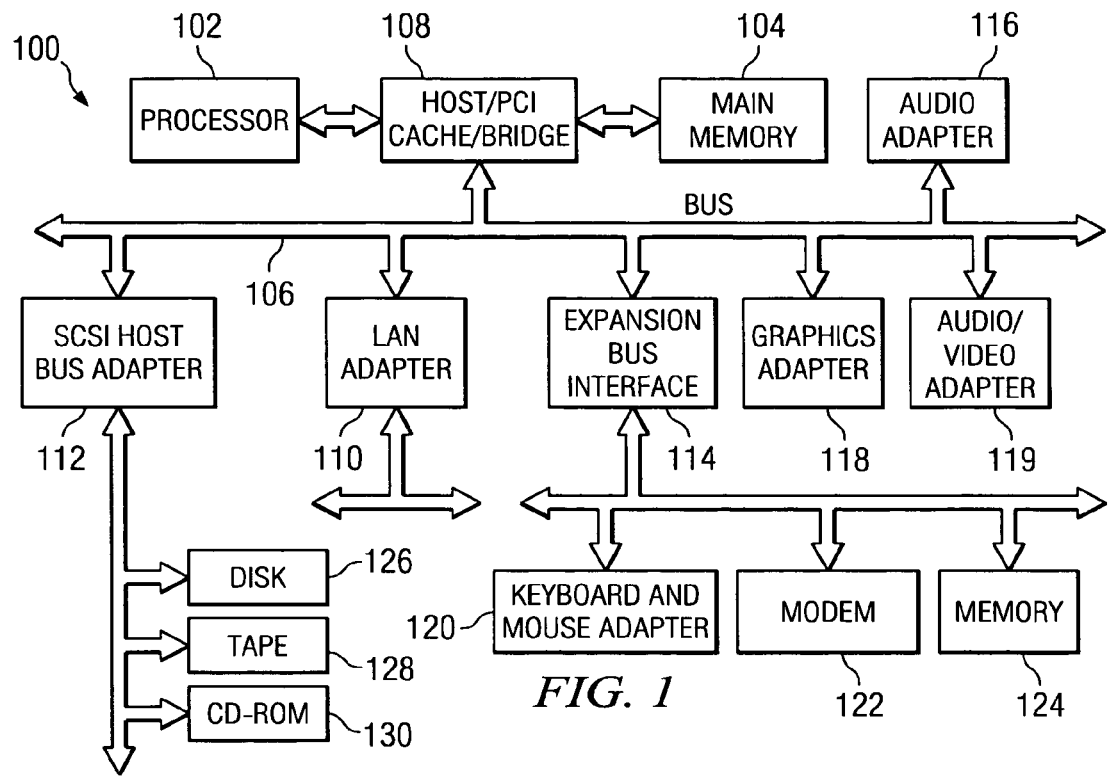
FIG. 1 is a block diagram of a data processing system in which the present invention may be implemented.

With reference now to FIG. 1, a block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
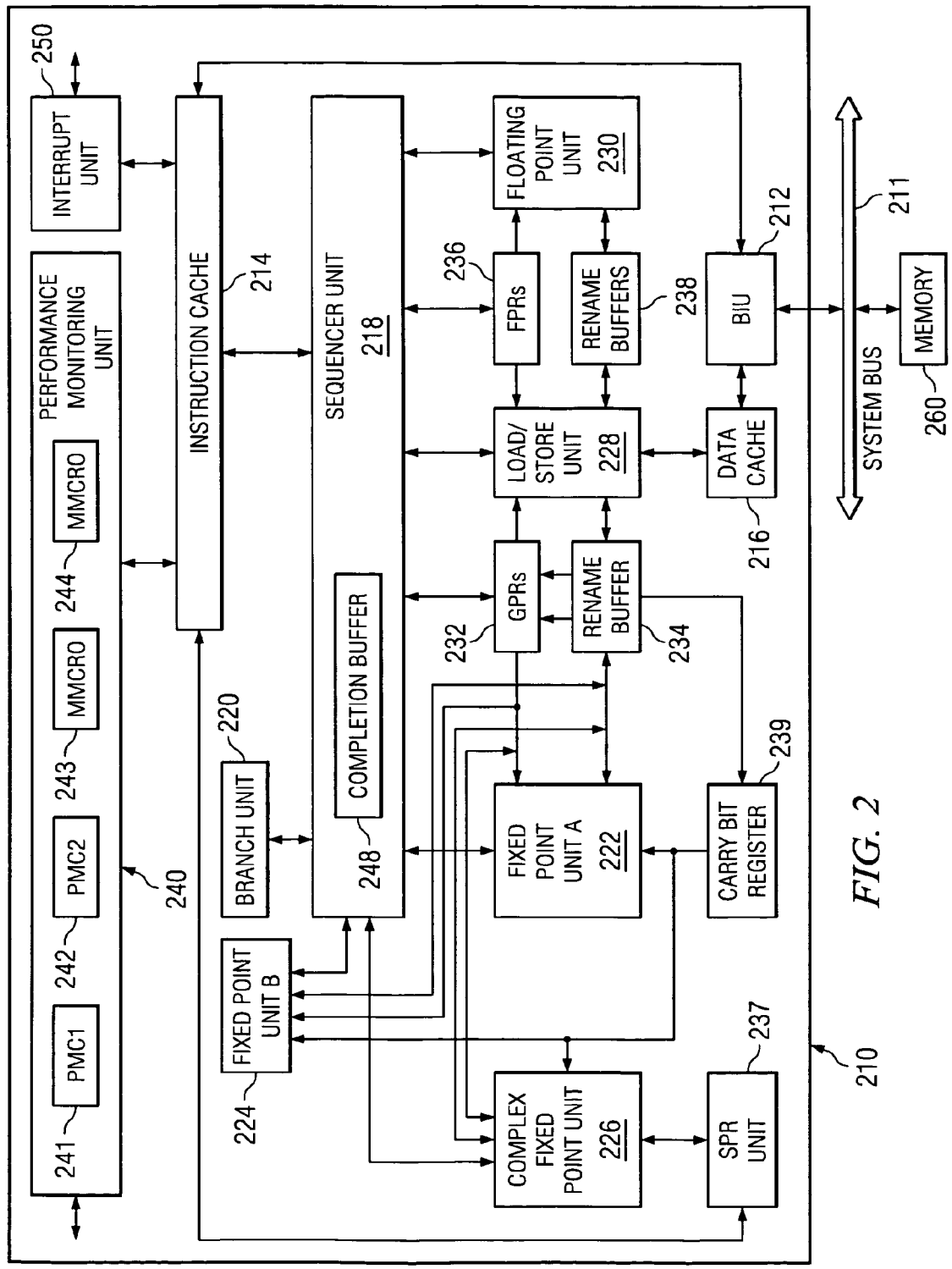
FIG. 2 is a block diagram of a processor system for processing information in accordance with a preferred embodiment of the present invention.

Turning next to FIG. 2, a block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 239) as specified by the instruction for which the selected rename buffer is allocated. Information stored at a selected one of rename buffers 234 is copied to its associated one of GPRs 232 (or CA register 239) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining. " In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance unit 240 may provide data for time profiling with support for dynamic address to name resolution.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The present invention provides an improved method, apparatus, and computer instructions for generating trace data. The mechanism of the present invention is especially useful for generating trace data used in time profile (tprof) performance analysis. The present invention recognizes that in executing a typical application, a relatively larger number of tprof events have evenly spaced time stamps. The mechanism of the present invention in one embodiment records a time stamp in the trace data only when a tprof event happens outside of an expected time period. If a tprof event happens before or after the expected time period, a time stamp is generated. Some margin of difference from the expected time period may be used before the time stamp is generated. The trace size is reduced by decreasing the number of time stamps recorded in the trace.

In another illustrative embodiment of the present invention, a history of prior records for tprof events is maintained. If a match between a new event and an event in the history occurs, only minimal data pointing to the location of the record for the event in the history is placed in the trace data. In this manner, the size of the trace may be reduced through the reduction of data needed for records in the trace.

Another illustrative example involves storing records for events in a hash table in which each record counts the number of occurrences of an event. Of course these events may be stored in other types of tables or data structures, depending on the particular implementation. When new code overlays the current code, an address to name resolution changes. At this time, the records in the hash table are placed into a trace and those records are invalidated. At that point, the hash is used to record data for events generated by the new code. In these examples, the code may take the form of modules that may be dynamically loaded and unloaded. By keeping counts of events, rather than generating a record for every event, this mechanism reduces the amount of trace data placed into a trace.

Figure 3:
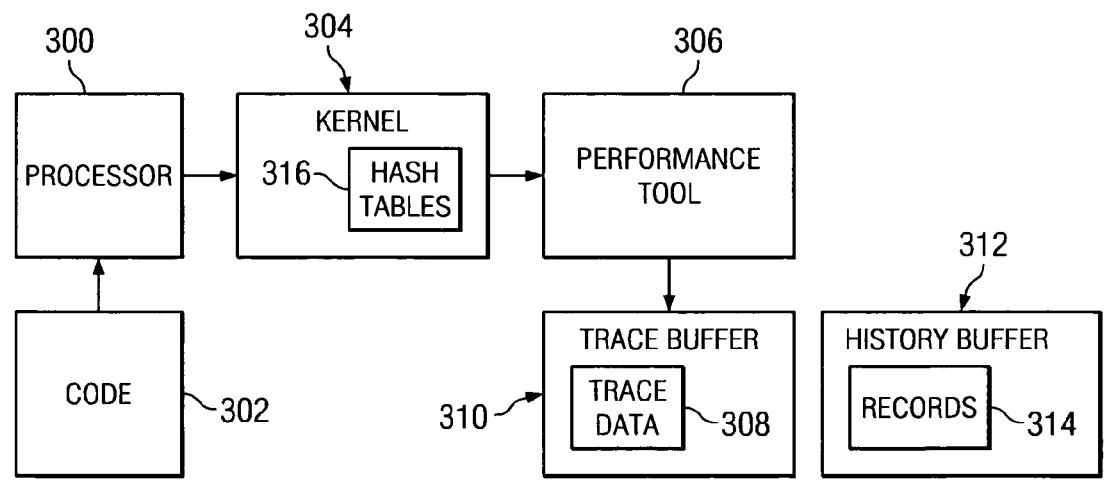
FIG. 3 is a diagram of components used to generate trace data in accordance with a preferred embodiment of the present invention.

With reference to FIG. 3, a diagram of components used to generate trace data is depicted in accordance with a preferred embodiment of the present invention. In this illustrative example, processor 300 generates events in response to executing instructions contained in code 302. As shown, the events are passed through kernel 304 to performance tool 306. Performance tool 306 is used to generate trace data 308, which is stored in trace buffer 310. Performance tool 306 is used in time profile performance analysis in these examples.

In one illustrative embodiment, performance tool 306 is configured to allow for longer tracing without having to increase the size of trace buffer 310. Performance tool 306 reduce the amount of data in trace data 308 by reducing the number of time stamps that are recorded and placed into trace data 308. When a first event is detected, a record or data in some other format is placed into trace data 308 for that event. A time stamp also is recorded for the event. When another event occurs, performance tool 306 determines whether the event has occurred within an expected time period. If this new event occurs within the expected time period, a time stamp is not generated for the new event, reducing the amount of data in trace data 308. If the new event does occurs before or after the expected amount of time a time stamp is generated. The expected amount of also may include a range of time within which the event may occur after the prior event before generating a time stamp.

The size of trace data 308 also may be reduced using history buffer 312. Records for events generated by processor 300 are recorded in records 314. Different tracing mechanisms may have totally different architectures for writing trace records. In an illustrative embodiment, each uncompressed trace record is aligned on a 4-byte boundary with the format: LLTT/maj, minor, TS, data1, data2, . . . , datan. The LL represents the length of the record in bytes, since on 4 byte boundaries, the lower two bits are zero. The lower two bits, TT, represents a type code with a specific value indicating that the record is compressed and does not have a timestamp. The format of the compressed record could even be such that actual byte count may differ from a normal trace record that ends on a 4 byte boundary. Alternatively, specific major codes or minor codes could be used to indicate the rest of the record format, including the existence of the timestamp. The amount of data in the record and the record type determines the length of the record. In an illustrative embodiment, the length of record is still on a 4 byte boundary, the major code indicates the record type and the minor code contains the compressed record data.

Two tprof records with the same process identifier (PID) and thread identifier (TID) can have a relatively small value of offset between program counter addresses. Such records do not necessarily have to be adjacent in a trace and not even in a trace of a single PID and TID.

The mechanism of the present invention provides a solution for trace data compression that exploits address offsets using a history buffer. Each tprof record, generated in response to an event, has either the complete PID, TID, and program counter address information or the offset in the history buffer of a record with the same PID, TID and program counter close to program counter for the current record, along with the distance of the program counter from that record in the history buffer. In these illustrative examples, history buffer 312 records PID, TID, and address information from last full tprof trace records in records 314. At each new tprof event, records 314 in history buffer 312 are searched for one or more records with the same PID and TID. For each matching record, the address offset is calculated and the smallest value of the offset is kept together with the distance from the end of the history buffer. If a match is not present, the complete tprof trace record is emitted to trace buffer 310 for placement in trace data 308 and a new record is written to the history buffer.

If a match is present, only the offset and the distance information are emitted for placement in trace data 308, preceded by a length of record format type. Both offset and distance can have variable number of bits, depending on the tracing format specified in the header. The offset is used to locate the matching record in records 314. The distance is the distance from a program counter in the record. Thus, if the PID and TID match, but the program counters are different, a distance between the program counters is included in the trace record. In an illustrative embodiment, the history buffer is not updated in this case. This feature is especially useful because during post processing, the size of the history buffer is known and must be reconstructed by using the same algorithm (during the real-time processing) against the full trace records. A reasonable approach would be that all new records are added in the history buffer starting at offset 0, next entry at offset 1, . . . offset n, then back to offset 0].

This solution enables longer tracing with the same size of the trace buffer, for example, the allocated memory space. Another benefit is that a compressed tprof trace with a shorter record can be better compressed using additional general compression algorithms such as gzip.

The mechanism of the present invention also compresses.data in trace data 308 through storing records in hash tables 316 together with counts of record occurrences. These records are dynamically invalidated with the data in those records being placed into trace data 308 when address to name resolution changes. An address to name resolution changes when a new piece of code is loaded such that the address of this new piece of code overlaps part or all of the current code for which records are being generated. This type of event is also referred to as a module table event (MTE). In these examples, hash tables 316 are located in a kernel, such as kernel 304 or in kernel device driver. A hash table is formed in hash tables 316 for each PID. Each record in hash tables 316 contains TID, address, count, and valid fields. Additional fields may be included depending on the particular implementation.

In this illustrative example, trace data is collected dynamically in hash tables 316, but without time stamps. When an MTE event happens, the contents of hash tables 316 are emitted to trace buffer 310 for placement into trace data 308 and hash tables 316 are invalidated. If no tprof events are present between two MTE events, hash tables 316 are not invalidated again.

At a tprof event, hash tables 316 are searched for a corresponding valid record. If a corresponding valid record is found, the count field in this record is incremented. If not, a valid record with a count of 1 is added to hash tables 316. In another illustrative example, only the records that were invalidated by an MTE event are emitted to trace buffer 310.

In these examples, each record in the tprof hash table has a name field. An MTE event that changes an address to name resolution results in invalidation of all records with addresses that correspond to the previous name(s) for that address range. Hence, only the invalid records are invalidated. Alternatively, new records are added using linked list approach, so that the head of the list always points to the most recent entry. At each tprof event, the count is incremented only for the most recent entry in the corresponding list. The length of linked lists is kept beneath the predefined length by emitting records to the trace buffer in first-in-first-out (FIFO) fashion whenever a list reaches the predefined length.

In this manner, the mechanism of the present invention provides real-time tprof with support for dynamic module or JIT compiled name resolution. This solution benefits of relatively small size of tprof buffer with static tables, while being able to collect data for workloads with JIT or dynamic module loading. This mechanism enables prolonged periods of tracing for complex workloads.

Turning now to FIG. 4, a diagram illustrating the generation of events and time stamps is depicted in accordance with a preferred embodiment of the present invention. In this example, event 400 is the first event that occurs for which trace data is generated. In response to the occurrence of event 400, trace data is generated and stored in trace 402. Trace 402 contains trace data similar to that in trace data 308 in FIG. 3.

This trace information in trace 402 also includes time stamp 404. When event 406 and event 408 occur, the period of time between these events correspond to a specific period of time. As a result, time stamps are not generated for the trace information for these two events. In addition, the time stamp may not be generated if these events occur within some range of time, rather than at the specific time period. This range of time allows for some variance to occur between events. In this example, event 410 does not occur at a specific period of time. As a result, time stamp 412 is generated and place into trace 402 along with other trace information for event 410.

The occurrence of events 414, 416, and 418 occur at the specified period of time. As a result, time stamps are not generated for these events. Event 420 does not occur at the specified period of time, resulting in time stamp 422 being generated.

Turning next to FIG. 5, a trace history is depicted in accordance with a preferred embodiment of the present invention. In this example, trace history 500 contains records 502, 504, 506, 508, 510, 512, and 514. Each of these records includes identifiers for event in the form of PIDs and TIDs. Additionally, in this illustrative example, each record also includes a program counter identifying the address in which the event occurred.

When an event occurs that is not found in the trace history, record 516 containing the TID, PID, address, and other trace data is generated. If an event matches a record in the trace history or has the same PID, TID, and its address is within the allowable distance, only the offset and distance information for the record is placed into the trace. This compressed or reduced size record is illustrated in record 518. This offset information in record 518 is used to identify an entry in the history buffer containing the full PID, TID, and other data normally found in a normal record. The distance in this record is used in the event that a record has a matching PID and TID, but the program counter is not the same. The difference in the two address identified in the program counters forms the distance in record 518. If the distance is greater than some selected amount, a new record will be generated.

In this example, the history buffer in which trace history 500 is located has a specific size. For an exemplary implementation, 256 entries are present in trace history 500 in the history buffer, and 256 offsets are allowed from entries in the history buffer, each represented by a single byte. Thus, the trace history would have, for example, PID, TID, and address or program counter. The uncompressed event would have the PID, TID, address, and other data as shown in record 516. The compressed event would have the offset in the history buffer, which indicated the PID, TID, and address of the previous event, but the distance would represent the distance from the previous address. This type of record is shown in record 518. In an illustrative embodiment this record has a length of 8 and only two bytes of the minor code are used; however, the two bytes of zero value compress well with the gzip algorithm for full compression.

Whenever an event occurs, the history buffer is checked for any entry, which is in the allowable distance from the specified entry. The length of the record or some type of indicator can be used to distinguish between full records and compressed records.

Many possible implementations and variations may occur depending on the particular tracing architecture or program. If instructions have fixed sizes, then the offsets may be the number of instruction distances. Distances may be defined as only positive or these distances also may allow for negative displacements. Allowing negative displacement may give the better performance characteristics, since the first entry is essentially random as one would expect other entries to be around the hot spot.

Figures 6, 7:
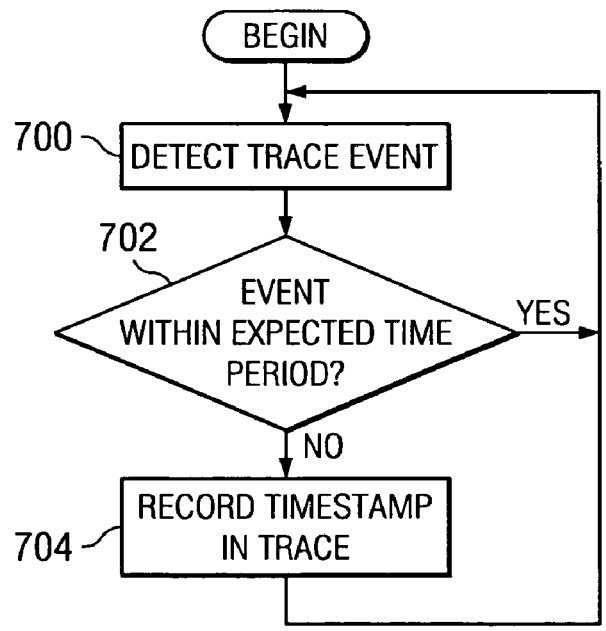
FIG. 6 is a hash table in accordance with a preferred embodiment of the present invention.
FIG. 7 is a flowchart of a process for compressing trace data by reducing the number of time stamps used in accordance with a preferred embodiment of the present invention.

Turning now to FIG. 6, a hash table is depicted in accordance with a preferred embodiment of the present invention. Hash table 600 is an example of a hash table, such as hash tables 316 in FIG. 3. In the illustrative example, a separate hash table is used for each PID. The TID and address would be used as second hash index into the PID owned hash table, a shown in records 602, 604, 606, and 608. Each entry in hash table 600 indicates the TID and address, so that counts would be incremented for the correct TID and address. A linked list is used for collisions. In these examples, a collision occurs when a hash table has the same PID and TID but has a different address.

When an MTE event occurs, this event refers to a specific PID. That entire PID hash table could be invalidated or a subset of this hash table may be invalidated. In one implementation, the PID has an ordered link list of MTEs, for example, [moduleY, 25000, 6000, . . . ], [moduleX, 32000, 4000, . . . ]. When a new MTE event occurs, any module that has an address in the region of the new MTE event has its data written to the trace buffer and invalidated.

In an alternative embodiment MTE entries for a specified PID are put into a linked list with new entries at the top, a LIFO list. In this illustrative embodiment, when a trace event occurs, the MTE list is searched for the last entry which has the specified address. When an MTE entry is found, an indicator of found the MTE entry is used as part of the table that has the TID and program counter address. With this approach, instead of using the name of the module or program, offsets within the MTE entries may be used.

Turning to FIG. 7, a flowchart of a process for compressing trace data by reducing the number of time stamps used is depicted in accordance with a preferred embodiment of the present invention. The process illustrated in FIG. 7 may be implemented in a profiling or tracing process, such as performance tool 306 in FIG. 3.

The process begins by detecting a trace event (step 700). In these examples, the trace event may be generated through an interrupt that occurs while the code executes. In particular, the trace event may be a tprof event. A determination is made as to whether the event is within the expected time period (step 702). The time period may be a specific period of time or may span a range of time to account for slight variations. If the event is not within the expected time period, the time stamp in the trace is recorded (step 704), with the process returning to step 700. This trace may be one that contains trace data, such as trace data 308 in FIG. 3. Depending on the particular implementation, the time stamp may take the form of a delta or difference between the current time in which the event occurred and a prior time stamp in the trace.

With reference again to step 702, if an event is within the expected time period, the process returns to step 700 to detect another trace event. In this case, a time stamp is not placed into the trace. When large numbers of event occur within the expected time period, the amount of trace data is reduced through this compression process.

Figure 8:
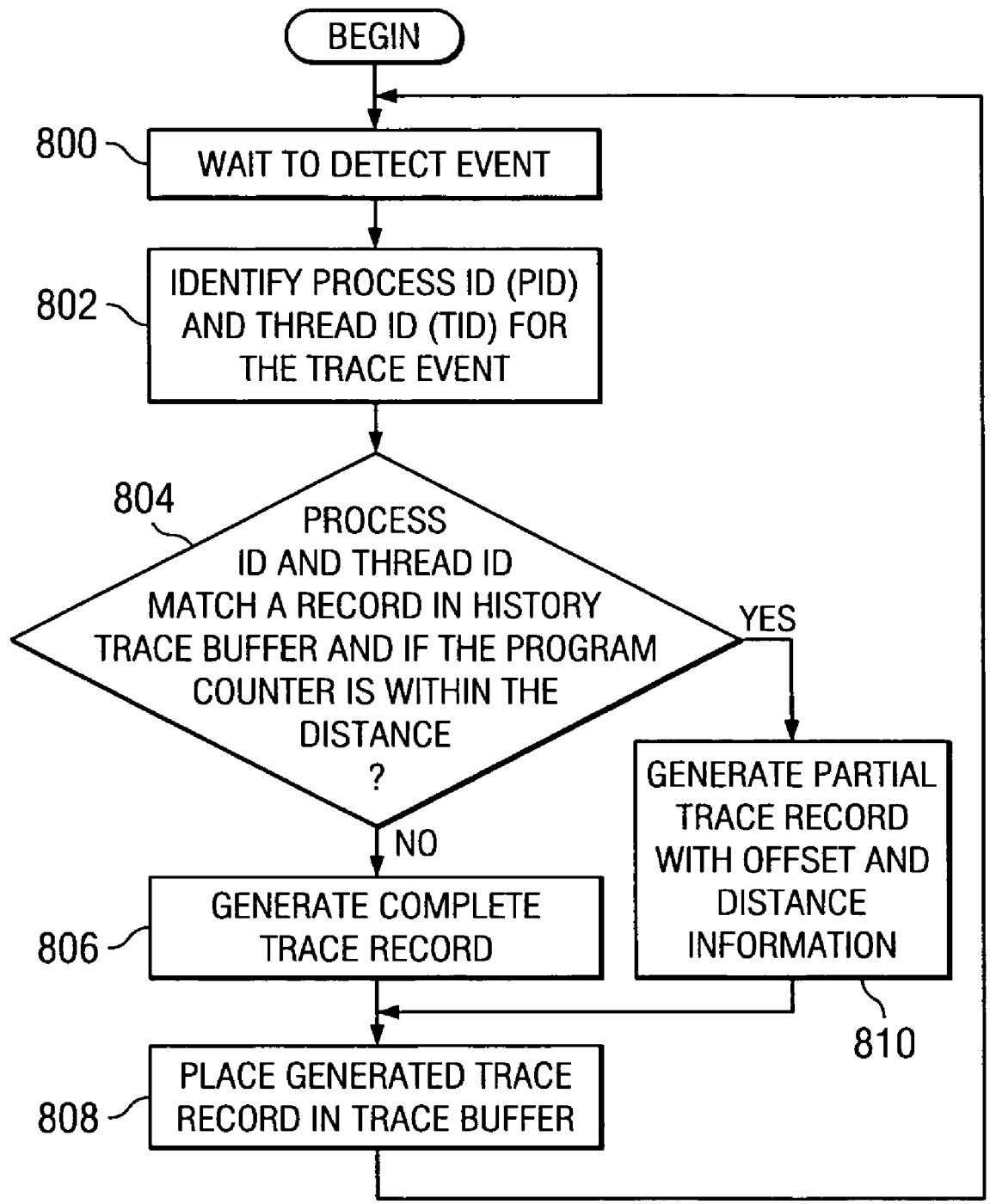
FIG. 8 is a flowchart of a process for compressing trace data in accordance with a preferred embodiment of the present invention.

Turning to FIG. 8, a flowchart of a process for compressing trace data is depicted in accordance with a preferred embodiment of the present invention. The process illustrated in FIG. 8 may be implemented in a profiling or tracing process, such as performance tool 306 in FIG. 3.

The process begins by waiting to detect an event (step 800). When an event is detected, the PID and TID for the trace event are identified (step 802). A determination is made as to whether the PID and TID match a record in the history trace buffer and if the program counter is within a selected distance (step 804). For example, this selected distance may be 256 bytes. This history trace buffer may be, for example, history buffer 312 in FIG. 3. If the PID and TID matching a record in the history trace buffer are not present, a complete trace record is generated (step 806). This trace record may be similar to record 516 in FIG. 5. The generated trace record is place in the trace buffer (step 808) with the process returning to step 800 to wait to detect another event. This trace buffer is similar to trace buffer 310 in FIG. 3. The record is part of the trace data, such as trace data 308 in FIG. 3.

Figure 9:
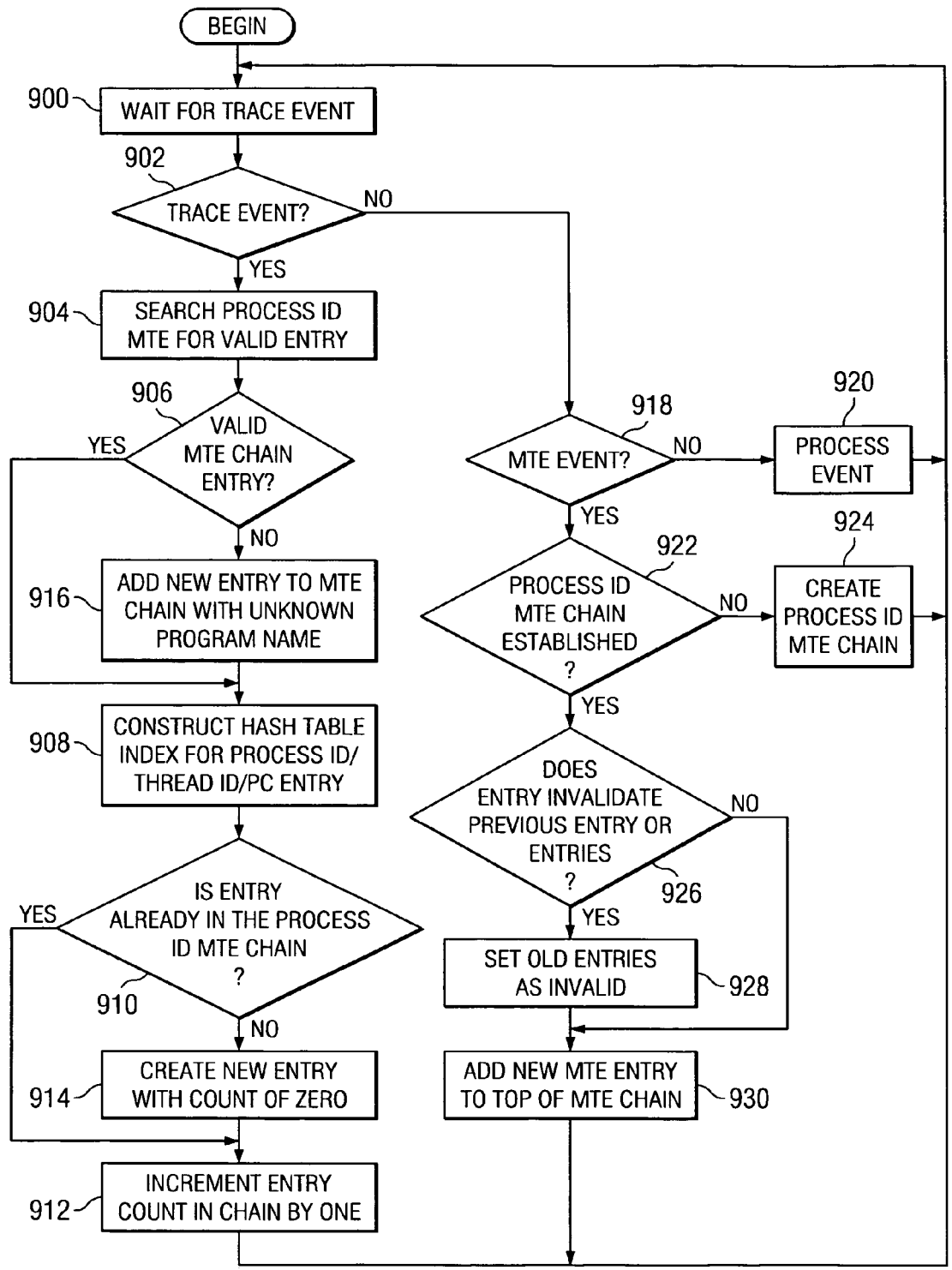
FIG. 9 is a flowchart of a process for generating trace data using a hash table in accordance with a preferred embodiment of the present invention.

Turning back to step 804, if the program counter is within the selected distance, a partial trace record with offset and distance information is generated (step 810). The offset indicated the offset of the record in the history trace buffer containing the matching PID and TID. In this depicted example, the distance information identifies the distance between the program counter address for the current event from the distance of the program counter addressed for the record. If the program counter address is identical to that for the program counter address in the record, the distance is equal to 0. The process then proceeds to step 808 to place the generated trace record into the trace buffer. Turning to FIG. 9, a flowchart of a process for generating trace data using hash tables is depicted in accordance with a preferred embodiment of the present invention. The process illustrated in FIG. 9 may be implemented in a profiling or tracing process, such as performance tool 306 in FIG. 3. This process also may be implemented within a kernel, such as kernel 304 in FIG. 3. In this illustrative embodiment, the records that are invalidated by the new module table entry are written out.

The process begins by waiting to detect an event (step 900). After an event has been detected, a determination is made as to whether the event is a trace event (step 902). If a trace event is present, a search is made to a PID module table entry (MTE) for a valid entry (step 904). The search made in step 904 is made within a linked list of MTEs for the PID. Each module table entry has a start address and length. The search involves traversing the link list until the program counter (PC) value is within a module range.

Next, a determination is made as to whether a valid MTE chain entry is found for the trace event (step 906). If a valid MTE entry is present, a hash table index is constructed for the entry containing the PID, TID, and PC (step 908). A determination is made as to whether an entry is already present in the PID MTE chain (step 910). If an entry is present, the count for the entry is incremented by 1 (step 912) with the process then returning to step 900 to wait for another event. Otherwise, a new entry with a count of 0 is created (step 914) with the process the proceeding to step 912 as described above.

With reference again to step 906, if a valid MTE entry is not present, a new chain entry is added to the MTE chain with an unknown program name (step 916). This indicates that the tprof tick or event is occurring in an area without any known address to name resolution. Referring back to step 902, if the event is not a trace event, a determination is made as to whether the event is an MTE event (step 918). If the event is not an MTE event, the event is processed (step 920) with the process then retuning to step 900.

In step 918, if an MTE event is present, a determination is made as to whether a PID MTE chain has been established (step 922). If an PID MTE chain has not been established, the PID MTE chain is created for the event (step 924) with the process then returning to step 900.

Otherwise, a determination is made as to whether the entry invalidates a previous entry or set of entries (step 926). With this approach, the entire MTE chain is checked to see if any of the addresses in the new entries range overlap a previous MTE entry. When this overlap occurs, the entire entry is deemed to be invalid. In an alternative embodiment, an indication of when a module is unloaded may be used to mark an MTE entry invalid. If the new entry is found to invalidate an old entry or set of entries, the old entry or set of entries are set as being invalid (step 928). Next, a new MTE entry is added to the top of the MTE chain (step 930) with the process then retuning to step 900 as described above. The process proceeds to step 930 from step 926 if the entry does not invalidate the previous entry or set of entries.

Thus, the present invention provides an improved method, apparatus, and computer instructions for generating trace data. The mechanism of the present invention decreases the size of trace data in a number of ways. In one illustrative embodiment, a time stamp is generated when a subsequent event does not occur at a specified time or within a specified time range. In another depicted embodiment, a trace history is employed to allow for the generation of compressed records when identifiers for new events match those in the trace history. In yet another illustrative embodiment, a hash table is used to collect counts of repeated events. In this manner, the use of one or more of these mechanisms allows for more trace data to be placed in the same amount of space. In the illustrative embodiments using a trace history or a table, the time stamps also are removed to provide additional compression for the trace data. Although the time stamps are removed in the illustrated examples, the time stamps may be used.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the events described in the illustrative embodiments are for time profile events. The mechanism of the present invention may be applied to any type of event. Also, although hash tables are shown in the illustrative examples, other types of tables or data structures may be used to hold data for events and counts of repeated events. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating trace data, the method comprising:
   detecting a new trace event;
   responsive to detecting the new trace event, determining whether the new trace event occurred at an expected period of time with respect to a prior trace event;
   responsive to determining that the new trace event did not occur at the expected period of time with respect to a prior trace event, placing a time stamp for the new trace event in the trace data, wherein time stamps for new trace events occurring at the expected period of time are eliminated from the trace data for providing compressed trace data; and
   storing the compressed trace data.

2. The method of claim 1, wherein the time stamp is delta from a prior time stamp.

3. The method of claim 1, wherein the time stamp includes a time of when the new trace event was detected.

4. The method of claim 1, wherein the determining step and the placing step are performed by a performance monitoring tool.

5. The method of claim 1, wherein storing the compressed trace data comprises:

storing the compressed trace data in a trace buffer.

6. The method of claim 1, wherein the determining step and the placing step are performed by a performance monitoring unit associated with a processor.

7. The method of claim 1, wherein the period of time is a range of time periods.

* * * * *